United States Patent
Chacko et al.

(10) Patent No.: US 9,468,224 B2
(45) Date of Patent: Oct. 18, 2016

(54) REMOVABLE POLYMER COMPOSITIONS

(75) Inventors: Sujith Chacko, Arcadia, CA (US); Prakash Mallya, Sierra Madre, CA (US); Xiang-Ya Li, San Gabriel, CA (US)

(73) Assignee: Avery Dennison Corporation, Glendale, CA (US)

(*) Notice: Subject to any disclaimer, the term of this patent is extended or adjusted under 35 U.S.C. 154(b) by 0 days.

(21) Appl. No.: 14/241,592

(22) PCT Filed: Aug. 31, 2012

(86) PCT No.: PCT/US2012/053311
§ 371 (c)(1),
(2), (4) Date: Feb. 27, 2014

(87) PCT Pub. No.: WO2013/033516
PCT Pub. Date: Mar. 7, 2013

(65) Prior Publication Data
US 2014/0205714 A1  Jul. 24, 2014

Related U.S. Application Data

(60) Provisional application No. 61/529,881, filed on Aug. 31, 2011.

(51) Int. Cl.
*A23G 4/06* (2006.01)
*C08F 26/06* (2006.01)
*C08F 26/08* (2006.01)
*C08L 39/04* (2006.01)
*A23G 4/08* (2006.01)
*C08L 33/14* (2006.01)
*C08F 216/14* (2006.01)
*C08F 220/18* (2006.01)
*C08F 220/36* (2006.01)

(52) U.S. Cl.
CPC . *A23G 4/08* (2013.01); *A23G 4/06* (2013.01); *C08F 26/06* (2013.01); *C08F 26/08* (2013.01); *C08L 33/14* (2013.01); *C08L 39/04* (2013.01); *C08F 216/1458* (2013.01); *C08F 220/18* (2013.01); *C08F 220/36* (2013.01)

(58) Field of Classification Search
CPC .. C08F 26/06; C08F 26/08; C08F 216/1458; C08F 220/18; C08F 220/36; A23G 4/08; A23G 4/06; C08L 39/04; C08L 33/14
USPC ........ 526/263, 264; 525/204, 303, 55; 426/4
See application file for complete search history.

(56) References Cited

U.S. PATENT DOCUMENTS

| | | | |
|---|---|---|---|
| 2,740,772 A * | 4/1956 | Alfrey, Jr. | A23G 4/06 426/1 |
| 3,285,750 A | 11/1966 | Ishida et al. | |
| 4,208,432 A | 6/1980 | Noborio et al. | |
| 4,259,355 A | 3/1981 | Marmo et al. | |
| 4,423,031 A * | 12/1983 | Murui et al. | 424/63 |
| 4,518,615 A | 5/1985 | Cherukuri et al. | |
| 4,810,763 A * | 3/1989 | Mallya et al. | 526/203 |
| 5,601,858 A | 2/1997 | Mansukhani et al. | |
| 5,656,705 A | 8/1997 | Mallya et al. | |
| 2006/0153949 A1 | 7/2006 | Gebreselassie et al. | |
| 2007/0042078 A1 | 2/2007 | Miladinov et al. | |
| 2010/0074987 A1* | 3/2010 | Neergaard | 426/4 |
| 2011/0123672 A1 | 5/2011 | Xia et al. | |

FOREIGN PATENT DOCUMENTS

| | | |
|---|---|---|
| CN | 1931917 | 3/2007 |
| CN | 101698965 A | 4/2010 |
| EP | 1496753 B1 | 6/2007 |
| WO | WO2005/118660 | 12/2005 |
| WO | WO2006/016179 | 2/2006 |
| WO | WO2008/145120 | 12/2008 |
| WO | WO2011057882 | 5/2011 |

OTHER PUBLICATIONS

Yamauchi et al. "Synthesis and characterization of telechelic multiple hydrogen bonded (MHB) macromolecules via living anionic polymerization", Polymer Preprints (American Chemical Society, Division of Polymer Chemistry) (2002), 43(1), 698-699 (STIC Search, pp. 25-27).*
Goh et al. "Cross-linked Poly(methacrylic acid-co-polyethylene oxide) methyl ether methacrylate) Microspheres and Microgels Prepared by Precipitation Polymerization: Morphology Study", Macromolecules, 2002, 35(27), 9983-9989 (STIC Search, pp. 173-175).*
International Search Report and Written Opinion issued in corresponding IA No. PCT/US2012/053311 dated Jan. 31, 2013.
International Preliminary Report on Patentability issued in corresponding IA No. PCT/US2012/053311 dated Mar. 4, 2014.
Response to IPRP filed in corresponding EP Application No. 12 759 865.4 dated Oct. 20, 2014.
Office Action issued in corresponding EP Application No. 12 759 865.4 dated Mar. 13, 2015.
International Preliminary Report on Patentability issued in corresponding IA No. PCT/US2012/021244 dated Jul. 25, 2013.
International Search Report and Written Opinion issued in corresponding IA No. PCT/US2012/021244 dated May 2, 2012.

* cited by examiner

*Primary Examiner* — Michael M Bernshteyn

(74) *Attorney, Agent, or Firm* — Avery Dennison Corporation

(57) ABSTRACT

The present invention relates to various polymer compounds and/or formulations and to methods for the synthesis of same. In one embodiment, the present invention is related to polymer compounds and/or formulations that enable one to more easily remove sticky articles (e.g., chewing gum) from various surfaces.

11 Claims, No Drawings

REMOVABLE POLYMER COMPOSITIONS

CROSS-REFERENCE TO RELATED APPLICATION

The present application is a 371 of International Application No. PCT/US2012/053311, which was published in English on Mar. 7, 2013, and claims the benefit of U.S. Provisional Application No. 61/529,881 filed Aug. 31, 2011, both of which are incorporated herein by reference in their entireties.

FIELD

The present invention relates to various polymer compounds and/or formulations and to methods for the synthesis of same. In one embodiment, the present invention is related to polymer compounds and/or formulations that enable one to more easily remove sticky articles (e.g., chewing gum) from various surfaces.

BACKGROUND

After being used or processed, some articles become sticky. Chewing gum is an example of such an article. After being chewed and without proper disposal, the gum is typically found sticking to sidewalks, building structures, or furniture, for example. Removal of chewed gum (also referred to as gum cud) is often difficult as the gum typically strings and breaks upon peeling off a surface, thereby leaving a portion of the gum on the surface. As a result, the surface must either be cleaned or other efforts undertaken to remove the gum. Improper disposal of used chewing gum has become such a significant environmental issue that certain public places such as schools, and even entire countries, such as Singapore, have banned chewing gum.

Thus, there is a need for a technique by which such articles can be rendered more easily removable. In particular, there is a need for a composition and/or formulation that permits, enables and/or facilitates the removal of improperly disposed chewing gum from an article and/or surface, or even a polymer composition that can be added to a chewing gum that permits, enables and/or facilitates the removal of improperly disposed chewing gum from an article and/or surface. On the other hand, other attributes which make the chewing gum desirable, such as chewability, elasticity, should not be compromised.

SUMMARY

The present invention relates to various polymer compounds and/or formulations and to methods for the synthesis of same. In one embodiment, the present invention is related to polymer compounds and/or formulations that enable one to more easily remove sticky articles (e.g., chewing gum) from various surfaces.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to various polymer compositions that are removable. The present invention is also directed to a removable article, such as chewing gum or gum base including the polymer compositions. The present invention is also directed to methods of improving the removability of chewing gum and gum bases. In another embodiment, the present invention is additionally directed to various methods of producing gum bases and chewing gums including the polymer compositions.

In one embodiment, the present invention relates to a removable polymer composition comprising a polymerization product of: (i) from about 10 weight percent to about 70 weight percent of one or more acrylic acid esters of alcohols or methacrylic acid esters of alcohols having from about 4 to about 14 carbon atoms; (ii) from about 0 weight percent to about 70 weight percent of one or more acrylic acid esters of alcohols or methacrylic acid esters of alcohols having from 1 to about 3 carbon atoms; (iii) from about 0 weight percent to about 70 weight percent of one or more polar monomers that can be copolymerized with at least one of (i) and (ii); and (iv) at least one hydrogen bonding monomer, wherein the polymerization process used to form the polymerization product is selected from emulsion polymerization, solution polymerization, hot melt polymerization, precipitation polymerization, anionic polymerization, cationic polymerization, controlled free radical polymerization or emulsifier free emulsion polymerization.

In another embodiment, the present invention relates to a removable polymer composition comprising a polymerization product of: (i) from about 10 weight percent to about 70 weight percent of one or more acrylic acid esters of alcohols or methacrylic acid esters of alcohols having from about 4 to about 14 carbon atoms; (ii) from about 0 weight percent to about 70 weight percent of one or more acrylic acid esters of alcohols or methacrylic acid esters of alcohols having from 1 to about 3 carbon atoms; (iii) from about 0 weight percent to about 70 weight percent of one or more polar monomers that can be copolymerized with at least one of (i) and (ii); and (iv) at least one telechelic hydrogen bonding polymer, wherein the polymerization process used to form the polymerization product is selected from emulsion polymerization, solution polymerization, hot melt polymerization, precipitation polymerization, anionic polymerization, cationic polymerization, controlled free radical polymerization or emulsifier free emulsion polymerization.

In still another embodiment, the present invention relates to a method of producing a chewing gum base which when incorporated into chewing gum renders the gum more easily removable, the method comprising the steps of: (A) providing a rubber component; (B) providing a removable polymer composition, where the removable polymer composition is in accordance with any of the composition disclosed herein; and (C) mixing the polymer composition and the rubber component to thereby produce a chewing gum base.

In still another embodiment, the present invention relates to a method of improving the removability of chewing gum, the method comprising the steps of: providing a chewing gum base; and incorporating an effective amount of at least one of the removable polymer compositions disclosed herein into the chewing gum base. In still another embodiment, a chewing gum produced by the above method is disclosed.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

DETAILED DESCRIPTION

As noted above, the present invention relates to various polymer compounds and/or formulations and to methods for the synthesis of same. In one embodiment, the present invention is related to polymer compounds and/or formulations that enable one to more easily remove sticky articles (e.g., chewing gum) from various surfaces.

The compositions and methods disclosed in this document are described in detail by way of examples and with reference to the discussion herein. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of compositions and methods are hereinafter disclosed and described in detail.

In another embodiment of the present invention, di(meth) acrylate monomers and poly(meth)acrylate monomers can be used in combination with other monomers. Suitable examples of such compounds include, but are not limited to, ethylene glycol diacrylate, 1,3-butanediol diacrylate, 1,4-butanediol diacrylate, 1,6-hexanediol diacrylate, poly(ethylene glycol) diacrylate and similar systems. One or more compounds from this group can be incorporated at various percentage of the composition. While not wishing to be bound to any one theory and/or embodiment, the diacrylates will increase the gel content of the polymers system and will impart the right sensory and removability properties.

In another embodiment of the present invention, removable polymers are synthesized from hydrogen bonding monomers. The hydrogen bonding monomers form strong bonds among them and can be easily switchable by addition of a third component which also has a hydrogen bonding tendency. The bonding strength changes with temperature as well. Directional bonds such as hydrogen bonds are usually weaker than ordinary chemical bonds. Hydrogen bond strength varies between 3 and 32 kJ/mol and is usually defined as the amount of energy required to separate a hydrogen bond pair. It is reported that there is a linear dependence of apparent hydrogen bond strength on temperature. (Dougherty, Journal of Chemical Physics, vol 109, 1998). Polymer chains associated with hydrogen bonds will have higher modulus at lower temperatures. In the presence of water, two major effects can take place for hydrogen bonded polymers. Polymers can be swollen by absorption of water through formation of hydrogen bonds with water and it could potentially act as a plasticizer and make the polymer soft. Water could also potentially reduce hydrogen bond strength between the moieties present in the polymer chain and make the polymer more pliable Since human saliva contains 99.5% water at body temperature, it could potentially soften the hydrogen bonded polymer and makes it easily chewable. Once the chewed gum is exposed to natural weathering conditions after spit out, the water present in the gum base will evaporate and potentially will increase the modulus of the polymer chain and will be easy to remove from the pavements. The increase in modulus can be attributed to tighter hydrogen bonding between the chains and it will in turn make the polymer easily removable. Due to the higher modulus of the polymer chain, its tendency of the polymer chains to flow will be hampered and will reduce the adhesion to the pavements and other surfaces and will enable easy removal.

One of the key monomers used in this area is acrylated or methacrylated Upy (Ureido Pyramidone). SIPOMER WAM, and SIPOMER WAM II from Rhodia are other hydrogen bonding monomers that can be used. These monomers and similar monomers can be copolymerized with other acrylic or methacrylic ester monomers to form the polymer chains which will show these properties associated with hydrogen bonding. The polymerization can be done using various techniques such as solution polymerization, bulk polymerization, controlled free radical polymerization and similar techniques. Similarly telechelic polymers can be synthesized using hydrogen bonding monomer as the telechelic part. Telechelic polyethylene glycols were synthesized and shown to have these properties. The strength of hydrogen bond will hold together the smaller chains to form the bigger chains and these can be switched easily by varying the temperature or by adding an external agent which interacts with the hydrogen bonding moieties. In many ways these polymers behave similar to conventional polymers, but their strong dependence of mechanical properties with temperature makes them very useful in various applications. The strength of the hydrogen bonding with various hydrogen bonding moieties is listed in Table 1 (see, Brusweld et. Al; Chem. Rev. 2001; 101; pp. 4071 to 4097).

TABLE 1

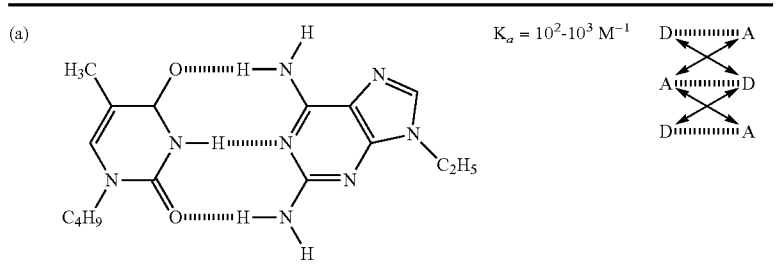

TABLE 1-continued

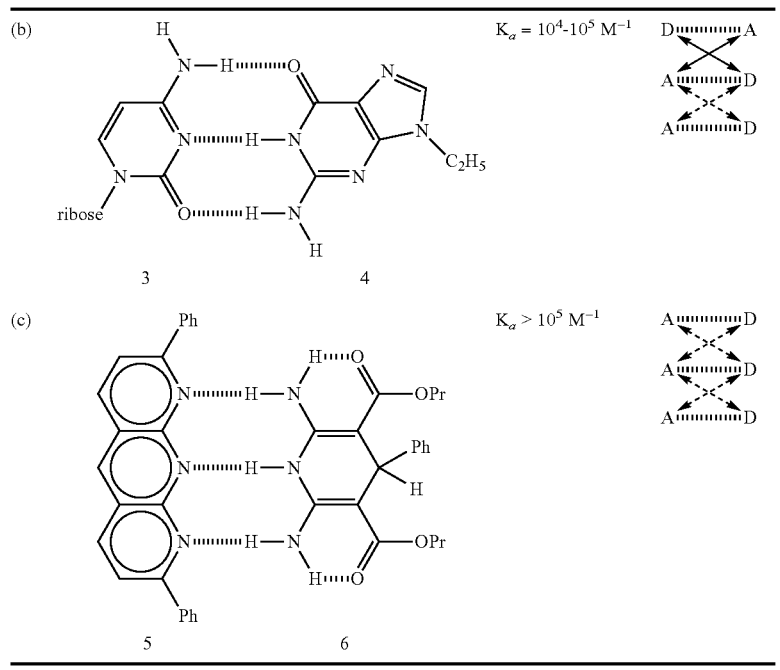

|||||| = (attractive) hydrogen bond

↗ = attractive secondary interaction

↗ = repulsive secondary interaction

One suitable type of hydrogen bonding chemical is ureidopirimidinone polymers. Table 2 shows the chemical structure of 2 such polymers bonded together (see, Angew. Chem.; Int. Ed. Engl. 1998; 37; pp. 1726 to 1729).

which helps the polymer chain to respond to stimuli. Other hydrogen bonding monomers can also be used for this approach. Different polymerization methods could be used to synthesize this polymer which includes bulk, solution,

TABLE 2

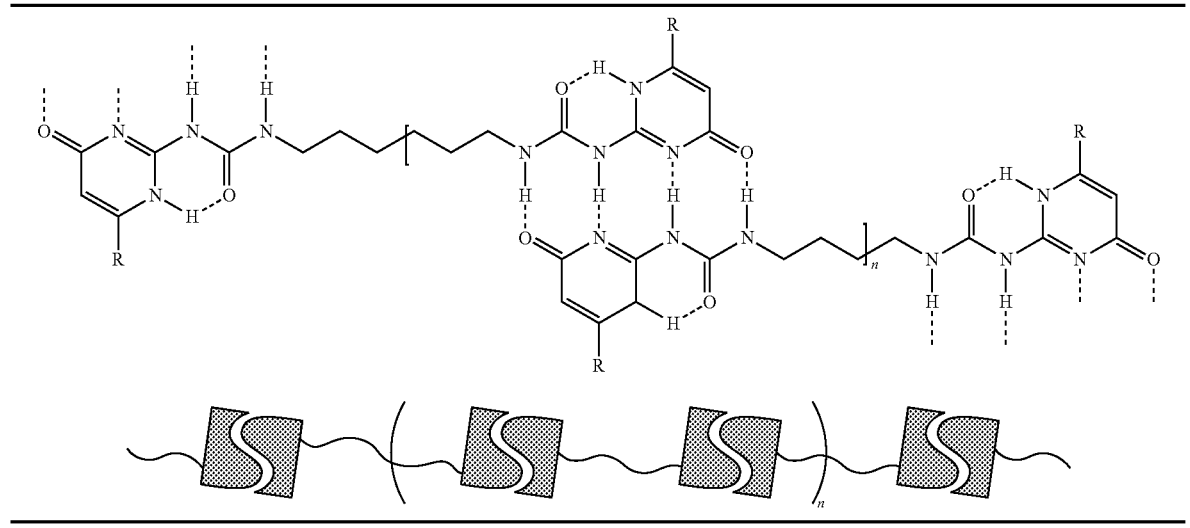

The acrylated ureidopirimidone and similar monomers can be copolymerized with other (meth)acrylic or ethylenenic monomers in the polymer chain to form hydrogen bonded structure. Similarly telechelic ureidopyrimidinone chains also incorporate hydrogen bonding into the system. Ureidopyrimidinone chains can be grafted into the system which also incorporates hydrogen bonding into the system suspension, emulsion, controlled free radical polymerization methods and other polymerization methods available. These hydrogen bonding monomers can be polymerized and blended with these polymer systems also to get to the same effect.

The extent of hydrogen bonding can vary in the polymer compositions in accordance with the present invention. The single hydrogen bonded systems can be the H bonding between pyridyl units and carboxylic acids. Difunctional diamino pyridine with difunctional uracil derivatives are examples of triple hydrogen bonding and so on. The hydrogen bonding can also be facilitated using acid-base interactions as well.

Given the above, in one embodiment the present invention relates to a removable polymer composition comprising a polymerization product of: (i) from about 10 weight percent to about 70 weight percent of one or more acrylic acid esters of alcohols or methacrylic acid esters of alcohols having from about 4 to about 14 carbon atoms; (ii) from about 0 weight percent to about 70 weight percent of one or more acrylic acid esters of alcohols or methacrylic acid esters of alcohols having from 1 to about 3 carbon atoms; (iii) from about 0 weight percent to about 70 weight percent of one or more polar monomers that can be copolymerized with at least one of (i) and (ii); and (iv) at least one hydrogen bonding monomer, wherein the polymerization process used to form the polymerization product is selected from emulsion polymerization, solution polymerization, hot melt polymerization, precipitation polymerization, anionic polymerization, cationic polymerization, controlled free radical polymerization or emulsifier free emulsion polymerization.

In another embodiment, the amount of component (i) is in the range of about from about 20 weight percent to about 60 weight percent, or from about 25 weight percent to about 50 weight percent, or even from about 30 weight percent to about 40 weight percent of the one or more acrylic acid esters of alcohols or methacrylic acid esters of alcohols having from about 4 to about 14 carbon atoms. In another embodiment, the amount of component (ii) is in the range of about 5 weight percent to about 60 weight percent, or from about 7.5 weight percent to about 55 weight percent, or from about 10 weight percent to about 50 weight percent, or from about 20 weight percent to about 40 weight percent, or even from about 25 weight percent to about 35 weight percent of the one or more acrylic acid esters of alcohols or methacrylic acid esters of alcohols having from 1 to about 3 carbon atoms. In another embodiment, the amount of component (iii) is in the range of about 5 weight percent to about 60 weight percent, or from about 7.5 weight percent to about 55 weight percent, or from about 10 weight percent to about 50 weight percent, or from about 20 weight percent to about 40 weight percent, or even from about 25 weight percent to about 35 weight percent of the one or more polar monomers that can be copolymerized with at least one of (i) and (ii). Here, as well as elsewhere in the specification and claims, individual numerical values, or limits, from one or more embodiments and/or different ranges can be combined to form additional non-disclosed and/or non-stated ranges.

Regarding the various components of the removable polymer compositions of the present invention and the amounts thereof, the following should be noted. Although the total amount of each compound or component of a various removable polymer composition may individually total more than 100 weight percent when each component is taken individually and totaled using the broadest amounts disclosed herein, one of skill in the art will realize that this is not the case. Rather, each individual component (i.e., components (i) through (iv) inclusive and, if present, components (v)) of a various removable polymer composition of the present invention can be varied within any stated range as desired in order to achieve a total weight percent of 100.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed:

1. A removable polymer composition comprising:
   a rubber component, and
   a polymerization product of:
   (i) from about 10 weight percent to about 70 weight percent of one or more acrylic acid esters of alcohols or methacrylic acid esters of alcohols having from about 4 to about 14 carbon atoms;
   (ii) from about 5 weight percent to about 60 weight percent of one or more acrylic acid esters of alcohols or methacrylic acid esters of alcohols having from 1 to about 3 carbon atoms;
   (iii) from about 5 weight percent to about 60 weight percent of one or more polar monomers copolymerizable with at least one of (i) and (ii), wherein the one or more polar monomer is selected from the group consisting of (meth)acrylic acid, (meth)acrylic amide, hydroxyethyl (meth)acrylates, hydroxypropyl (meth)acrylates, di-,tri-,tetra-, and polyethylene glycol (meth)acrylates, di-,tri-,tetra-, and polypropylene glycol (meth)acrylates, (meth)acrylates of copolymers of ethylene glycol and propylene glycol, N,N-dialkylacrylamide, N-vinylpyrrolidone, and combinations thereof; and
   (iv) at least one hydrogen bonding monomer,
   wherein the at least one hydrogen bonding monomer is selected from the group consisting of acrylic or methacrylic ureido pyramidone allyl ureido, methacrylamido ethyl ethylene urea (MAEEU), and combinations thereof.

2. A removable polymer composition according to claim 1 wherein the hydrogen bonding polymer is telechelic.

3. The polymer composition of claim 2, further comprising two or more telechelic hydrogen bonding polymers.

4. The polymer composition of claim 1, wherein the one or more acrylic acid ester of an alcohol or methacrylic acid ester of an alcohol having from about 4 to about 14 carbon atoms is selected from ethyl hexyl acrylate (EHA), butyl acrylate (BA), isooctyl acrylate (IOA), lauryl acrylate, isobornyl acrylate, and combinations thereof.

5. The polymer composition of claim 1, wherein of acrylic acid ester of an alcohol or methacrylic acid ester of an alcohol having from 1 to about 3 carbon atoms is selected from methyl acrylate (MA), ethyl acrylate (EA), propyl acrylate (PA), methyl methacrylate (MMA), ethyl methacrylate (EMA), and combinations thereof.

6. A removable polymer composition of claim 1, further comprising of at least one of polyethylene glycol acrylate, polyethylene glycol methacrylate, polypropylene glycol acrylate, polypropylene glycol methacrylate, higher polyalkyl glycol acrylates, higher polyalkyl glycol methacrylates or suitable mixtures of two or thereof.

7. A removable polymer composition of claim 6, further comprising at least one of polyethylene glycol, polypropylene glycol, high alkyl glycols, copolymer of polyethylene glycol-poly propylene glycol, copolymer of poly ethylene glycol-high alkyl glycol, copolymer of poly propylene glycol-high alkyl glycol, or suitable mixtures of two or more thereof.

8. A chewing gum base for a removable chewing gum composition comprising:
   a rubber component, and
   at least one removable polymer composition of claim 1.

9. A removable polymer composition according to claim 1 wherein the polymerization process used is selected from the group consisting of suspension polymerization, emulsion polymerization, solution polymerization, hot melt polymerization, precipitation polymerization, anionic polymerization, cationic polymerization, controlled free radical polymerization, and emulsifier free emulsion polymerization.

10. A removable polymer composition according to claim 1 wherein the one or more acrylic acid ester of an alcohol or methacrylic acid ester of an alcohol having from 1 to about 3 carbon atoms is about 7.5 weight percent to about 55 weight percent.

11. A removable polymer composition according to claim 1 wherein the one or more one or more polar monomers is about 7.5 weight percent to about 55 weight percent.

* * * * *